April 11, 1950 J. WINSON 2,503,572
REVERSIBLE PRESS
Filed June 16, 1947
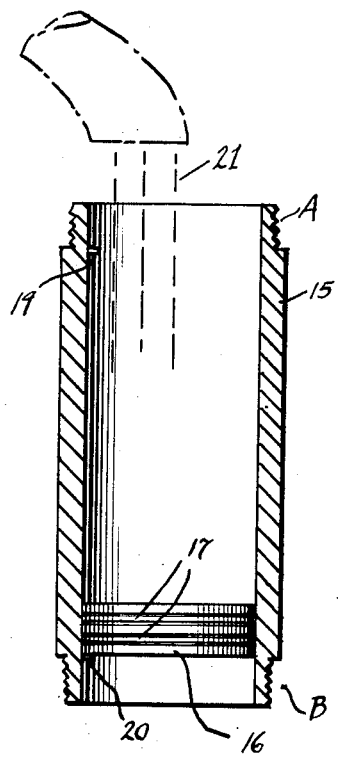
Fig. 1
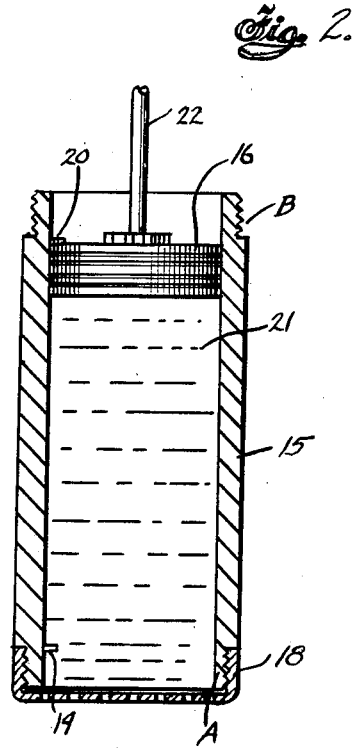
Fig. 2
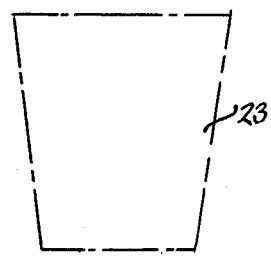
JONATHAN WINSON
INVENTOR.
BY: [signature]
ATTORNEY Patented Apr. 11, 1950

2,503,572

UNITED STATES PATENT OFFICE 2,503,572

REVERSIBLE PRESS

Jonathan Winson, New York, N. Y.

Application June 16, 1947, Serial No. 754,817

2 Claims. (Cl. 100—50)

The invention relates to juice extractors for fruits and vegetables, and particularly to the press type embodying a piston acting within a cylinder.

An object of this invention is to provide a novel and improved press receptacle and fitted piston to insure efficient press operation, and of a construction permitting the piston to extract juice during each stroke thereof.

Another object of the present invention is to provide a device of the character mentioned, of novel and improved construction, which is easy to use, reasonably cheap to manufacture and efficient in carrying out the purposes for which it is designed.

Other objects, purposes and advantages will become apparent as this disclosure proceeds.

In the accompanying drawings forming part of this specification, similar characters of reference indicate corresponding parts in all the views.

Fig. 1 is a central longitudinal section of a press constructed in accordance with the teachings of this invention, shown receiving a supply of substance to be pressed, from the delivery spout of a comminutor.

Fig. 2 shows a similar view of said device in inverted position, provided with a strainer cap through which the pressed-out juice will flow, upon downward movement of the piston component by a ram rod operated in any suitable manner.

In the drawings, the embodiment shown comprises a tubular member 15, within which, adapted for slidable movement therealong, is a piston 16, provided with the piston rings 17, contacting the interior of said tubular member or cylinder to insure a leak-proof fit. Said cylinder member 15 is open at both ends marked A and B. A perforated cap 18, is detachably mountable to cover either of said ends, one at a time, in any suitable manner, as for instance by the threaded engagement illustrated. Interiorly of cylinder 15, are the pins 19 and 20, one near each end thereof, which pins serve as stops for piston movement.

In operation, referring to Fig. 1, cap 18 is removed from cylinder 15, and piston 16 is positioned at end B of the cylinder, in contact with stop pin 20. The device thus serves as a receptacle to receive through end A, pressable or comminuted fruit and vegetable substance 21. When the receptacle is so filled, the cap 18 is fitted onto end A, and in any suitable manner, as for instance on a stand not shown, the cylinder 15 is held against movement while the piston 16 is pushed by a ram rod 22, or other suitable means, from end B towards end A of the cylinder 15, to whatever magnitude of pressure is desired. It is evident that the juice contained in the substance 21, is squeezed or pressed out through the openings in the cap 18, and collected in a container 23, as in Fig. 2.

The cap 18 is now removed. The pulp remaining of the substance 21, which is now all at and accessible from end A, is disposed of. The cylinder can now be filled through end B and the operation of the device as a press, repeated. In this manner we have a reversible press, in which at each stroke of the piston 16, juice is pressed from a fresh supply of substance to be so treated.

This invention is capable of numerous forms and various applications without departing from the essential features herein disclosed. It is therefore intended and desired that the embodiment shown herein be deemed illustrative and not restrictive and that the patent shall cover all patentable novelty herein set forth; reference being had to the following claims rather than to the specific description herein to indicate the scope of this invention.

I claim:

1. In a device for pressing substances to extract the juice therefrom, a tubular member to receive such substances therein, alternately at each end thereof, a piston means positioned within and slidable along the tubular member, substantially in leak-proof contact therewith, and a closure member adapted to be detachably mounted across one end of the tubular member at a time; the end to be so closed at any time, being the one through which fresh substance was last put into the tubular member; at least one of said members having an aperture for the flow of juice therethrough.

2. In a device for pressing substances to extract the juice therefrom, a tubular member to receive such substances therein, alternately at each end thereof, a piston means positioned within and slidable along the tubular member, substantially in leak-proof contact therewith, and a perforated closure member adapted to be detachably mounted across one end of the tubular member at a time; the end to be so closed at any time, being the one through which fresh substance was last put into the tubular member.

JONATHAN WINSON.

REFERENCES CITED

The following references are of record in the file of this patent:

UNITED STATES PATENTS

| Number | Name | Date |
|---|---|---|
| 302,675 | Suits | July 29, 1884 |
| 761,860 | Taylor | June 7, 1904 |
| 1,837,048 | Ipri | Dec. 15, 1931 |